(12) United States Patent
Hosokawa et al.

(10) Patent No.: US 12,080,855 B2
(45) Date of Patent: Sep. 3, 2024

(54) NON-AQUEOUS ELECTROLYTE SECONDARY BATTERY

(71) Applicant: SANYO Electric Co., Ltd., Daito (JP)

(72) Inventors: Takafumi Hosokawa, Hyogo (JP); Takashi Hosokawa, Hyogo (JP); Kyohei Kobayashi, Kyoto (JP); Shuji Ogawa, Fukuoka (JP)

(73) Assignee: SANYO Electric Co., Ltd., Osaka (JP)

( * ) Notice: Subject to any disclaimer, the term of this patent is extended or adjusted under 35 U.S.C. 154(b) by 650 days.

(21) Appl. No.: 17/286,683

(22) PCT Filed: Nov. 25, 2019

(86) PCT No.: PCT/JP2019/045912
§ 371 (c)(1),
(2) Date: Apr. 19, 2021

(87) PCT Pub. No.: WO2020/110975
PCT Pub. Date: Jun. 4, 2020

(65) Prior Publication Data
US 2021/0351441 A1 Nov. 11, 2021

(30) Foreign Application Priority Data
Nov. 28, 2018 (JP) .................................. 2018-222463

(51) Int. Cl.
*H01M 10/0587* (2010.01)
*H01M 10/0525* (2010.01)
(Continued)

(52) U.S. Cl.
CPC ... *H01M 10/0587* (2013.01); *H01M 10/0525* (2013.01); *H01M 50/46* (2021.01);
(Continued)

(58) Field of Classification Search
None
See application file for complete search history.

(56) References Cited

U.S. PATENT DOCUMENTS

| | | |
|---|---|---|
| 2012/0058373 A1 | 3/2012 | Morikawa et al. |
| 2014/0072849 A1 | 3/2014 | Nitta et al. |

(Continued)

FOREIGN PATENT DOCUMENTS

| | | |
|---|---|---|
| CN | 102257667 A | 11/2011 |
| CN | 103682465 A | 3/2014 |

(Continued)

OTHER PUBLICATIONS

Extended (Supplementary) European Search Report dated Dec. 22, 2021, issued in counterpart EP Application No. 19888809.1. (24 pages).

(Continued)

*Primary Examiner* — Lisa S Park
(74) *Attorney, Agent, or Firm* — WHDA, LLP

(57) ABSTRACT

A decrease in energy density of a battery is suppressed, and the occurrence of internal short circuit between a positive plate and a negative plate located at the innermost circumference of a curved portion of a flat electrode assembly, where the curvature of the curved portion is greatest, is suppressed. In a nonaqueous electrolyte secondary battery including a flat wound electrode assembly (14), the electrode assembly (14) has a pair of curved portions (20A, 20B) located at either end and a flat portion (21) located between the pair of curved portions. In at least one of the curved portions, at least two layers of a second electrode plate are disposed on an inner side of a curved portion of a first electrode plate located at an innermost circumference.

6 Claims, 2 Drawing Sheets

(51) Int. Cl.
    *H01M 50/46*     (2021.01)
    *H01M 50/463*     (2021.01)
    *H01M 50/489*     (2021.01)
    *H01M 50/409*     (2021.01)

(52) U.S. Cl.
    CPC ....... *H01M 50/463* (2021.01); *H01M 50/489* (2021.01); *H01M 50/409* (2021.01)

(56) References Cited

U.S. PATENT DOCUMENTS

| | | |
|---|---|---|
| 2017/0162913 A1 | 6/2017 | Ohashi |
| 2021/0111465 A1 | 4/2021 | Mizawa et al. |

FOREIGN PATENT DOCUMENTS

| | | |
|---|---|---|
| JP | 2001-273881 A | 10/2001 |
| JP | 2011-100591 A | 5/2011 |
| JP | 2012-49089 A | 3/2012 |
| JP | 2014-56742 A | 3/2014 |
| JP | 2017-103111 A | 6/2017 |
| WO | 2010/100940 A1 | 9/2010 |
| WO | 2018/180748 A1 | 10/2018 |

OTHER PUBLICATIONS

International Search Report dated Feb. 10, 2020, issued in counterpart application No. PCT/JP2019/045912, with English translation. (4 pages).

English Translation of Chinese Search Report dated Dec. 4, 2023, issued in counterpart CN application No. 201980061040.8. (3 pages).

NON-AQUEOUS ELECTROLYTE SECONDARY BATTERY

TECHNICAL FIELD

The present invention relates to a nonaqueous electrolyte secondary battery including a flat wound electrode assembly.

BACKGROUND ART

As a nonaqueous electrolyte secondary battery, such as a lithium-ion secondary battery, a prismatic secondary battery including a flat wound electrode assembly housed in a prismatic battery case is known.

A flat electrode assembly is formed by winding, into a circular shape, a positive plate having a positive electrode mixture layer formed on a surface of a positive electrode current collector, a negative plate having a negative electrode mixture layer formed on a surface of a negative electrode current collector, and a separator disposed therebetween and, thereafter, pressing the wound electrode assembly into a flat shape.

Such a flat electrode assembly has a pair of curved portions at either end. In the flat electrode assembly, the curvature of a curved portion of the positive plate or the negative plate is greatest at the innermost circumference side. For this reason, the separator is stretched thin at the innermost circumference side of the curved portion and, thus, the breakdown voltage of the separator is locally reduced. As a result, when a high voltage is applied to the positive plate and the negative plate, insulation breakdown may occur in the separator that was stretched thin.

In addition, the positive plate and the negative plate located at the innermost circumference, where the curvature of the curved portion is greatest, are subjected to high stress. As a result, the positive electrode mixture layer or the negative electrode mixture layer may be peeled off from the positive or negative electrode current collector and may break through the separator, leading to internal short circuit.

To prevent a decrease in the local breakdown voltage of the separator and to prevent internal short circuit caused by peel-off of the electrode mixture layer, the thickness of the separator can be increased. However, in this case, the increased thickness of the separator leads to a decrease in the energy density of the battery. For this reason, this technique is difficult to apply to batteries that are designed for high energy density.

Meanwhile, PTL 1 describes a method for attaching an insulating tape to a curved portion of a positive electrode current collector located at the innermost circumference side. As a result, peel-off of the positive or negative electrode mixture layer having the greatest curvature at the innermost circumference can be suppressed and, thus, an internal short circuit can be prevented.

CITATION LIST

Patent Literature

PTL 1: Japanese Published Unexamined Patent Application No. 2012-49089

SUMMARY OF INVENTION

Technical Problem

In the method described in PTL 1, since an insulating tape is partially attached to a curved portion of the positive electrode current collector located at the innermost circumference side, a decrease in the energy density of the battery can be suppressed. However, it is difficult to attach an insulating tape along only the curved portion. For this reason, this technique is difficult to apply to mass production. In addition, because the mixture layer on the surface having the insulating tape attached thereto does not appear in the battery reaction, a non-uniform battery reaction area is generated on the facing surface between the positive electrode mixture layer and the negative electrode mixture layer. For this reason, localized current concentration may occur at the boundary portion of the surface having the insulating tape attached thereto. As a result, deposition of metallic lithium may occur on the current concentrated area, leading to internal short circuit.

The present invention has been made in view of the above circumstances, and a primary object of the present invention is to suppress a decrease in the energy density of a nonaqueous electrolyte secondary battery including a flat wound electrode assembly and suppress the occurrence of an internal short circuit between the positive and negative plates located at the innermost circumference where the curvature of a curved portion is greatest.

Solution to Problem

According to the present invention, a nonaqueous electrolyte secondary battery includes an electrode assembly formed by winding, into a flat shape, a first electrode plate having a first electrode mixture layer formed on a first electrode current collector, a second electrode plate having a second electrode mixture layer formed on a second electrode current collector, and a separator therebetween. The electrode assembly has a pair of curved portions located at either end and a flat portion between the pair of curved portions. In at least one of the pair of curved portions, at least two layers of the second electrode plate are disposed on an inner side of a curved portion of the first electrode plate located at an innermost circumference.

Advantageous Effects of Invention

The present invention is capable of suppressing a decrease in the energy density of a nonaqueous electrolyte secondary battery including a flat wound electrode assembly and suppressing the occurrence of an internal short circuit between the positive and negative plates located at the innermost circumference where the curvature of a curved portion is greatest.

DESCRIPTION OF EMBODIMENTS

Embodiments of the present invention are described in detail below with reference to the accompanying drawings. Note that the present invention is not limited to the following embodiments. In addition, modification can be made as appropriate without departing from the scope of the effect of the present invention.

Figure 1:
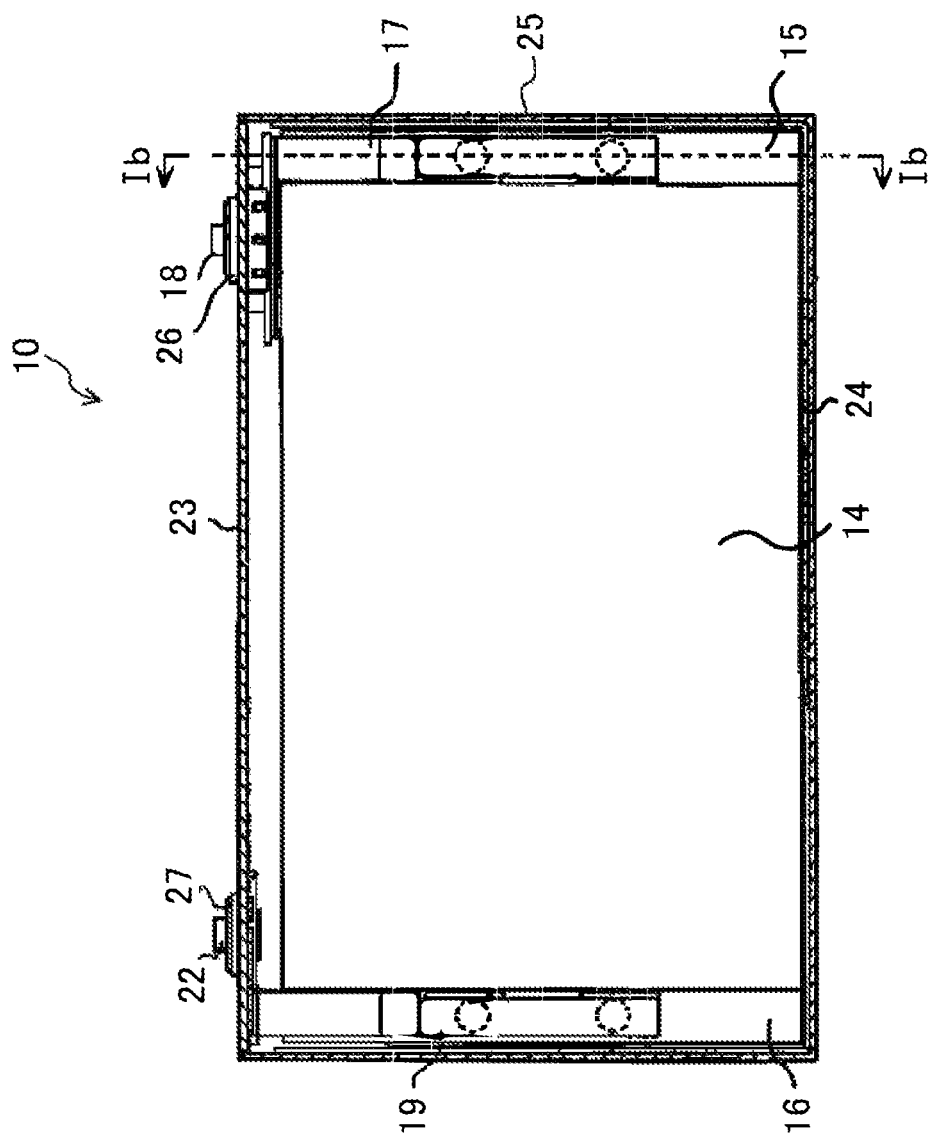
FIGS. 1(*a*) and 1(*b*) are a schematic illustration of the configuration of a nonaqueous electrolyte secondary battery according to an embodiment of the present invention, where FIG. 1(*a*) is a sectional view and FIG. 1(*b*) is a sectional view taken along a line Ib-Ib of FIG. 1(*a*).
Figure 1:
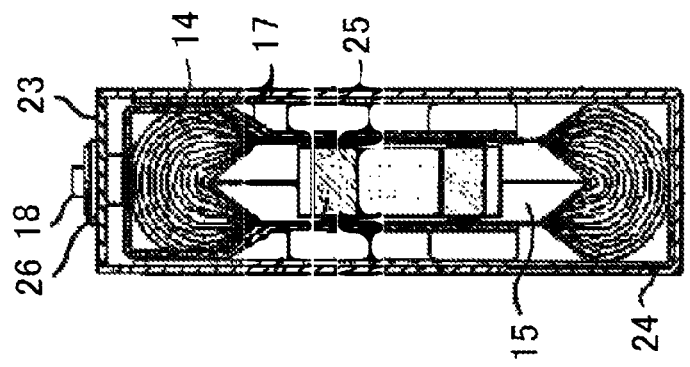

FIGS. 1(a) and 1(b) are schematic illustrations of the configuration of a nonaqueous electrolyte secondary battery according to an embodiment of the present invention, where FIG. 1(a) is a sectional view, and FIG. 1(b) is a sectional view taken along a line Ib-Ib of FIG. 1(a).

As illustrated in FIGS. 1(a) and 1(b), a nonaqueous electrolyte secondary battery 10 according to the present embodiment includes a flat electrode assembly 14 that is formed by winding, into a flat shape, a positive plate, a negative plate, and a separator therebetween and that is housed in a prismatic battery case 25. The positive plate has a positive electrode mixture layer formed on a positive electrode current collector, and the negative plate has a negative electrode mixture layer formed on the negative electrode current collector. In addition, the electrode assembly 14 is wrapped by an insulating sheet 24 and is housed in the battery case 25. Furthermore, the opening of the battery case 25 is sealed with a sealing plate 23, and a positive electrode terminal 18 and a negative electrode terminal 22 are fixed to the sealing plate 23 via insulating members 26 and 27, respectively.

A positive electrode current collector exposed portion 15 is formed at one end of the positive plate so that the positive electrode current collector is exposed, and a negative electrode current collector exposed portion 16 is formed at the other end of the negative plate so that the negative electrode current collector is exposed. A plurality of stacked positive electrode current collector exposed portions 15 are disposed at one end of the electrode assembly 14, and a plurality of stacked negative electrode current collector exposed portions 16 are disposed at the other end of the electrode assembly 14.

The plurality of stacked positive electrode current collector exposed portions 15 are electrically connected to the positive electrode terminal 18 via a positive electrode current collector plate 17, and the plurality of negative electrode current collector exposed portions 16 are electrically connected to the negative electrode terminal 22 via a negative electrode current collector plate 19.

Figure 2:
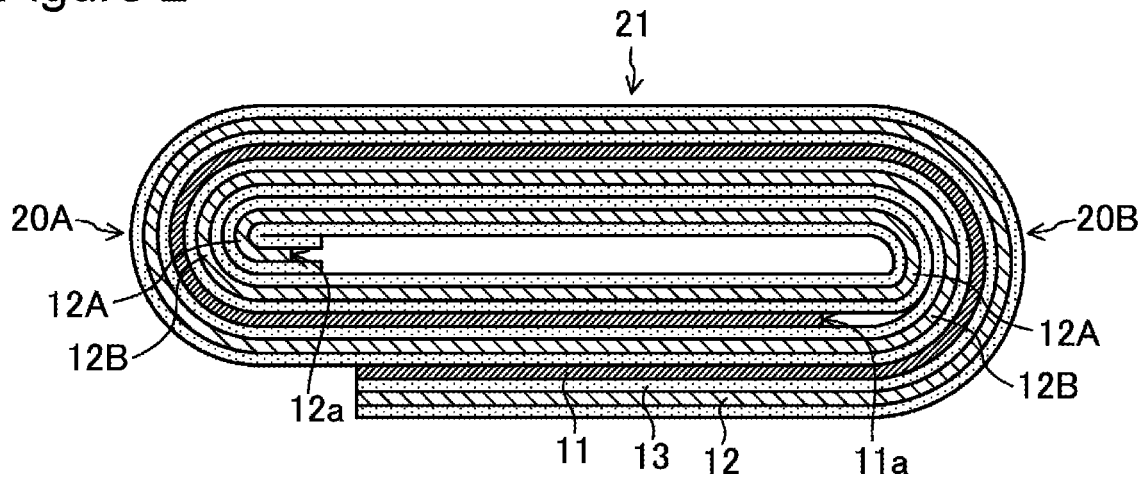
FIG. 2 is a sectional view schematically illustrating the configuration of an electrode assembly according to an embodiment (Embodiment 1) of the present invention.

FIG. 2 is a sectional view schematically illustrating the configuration of the electrode assembly 14 according to the present embodiment. Herein, the flat electrode assembly 14 is formed by winding, into a circular shape, a positive plate 11 having a positive electrode mixture layer on the surface of the positive electrode current collector, a negative plate 12 having a negative electrode mixture layer on the surface of the negative electrode current collector, and a separator 13 disposed therebetween and, thereafter, pressing the wound electrode assembly into a flat shape. Note that the positive plate 11, the negative plate 12, and the separator 13 disposed therebetween may be wound into a flat shape and, thereafter, be subjected to pressing.

The flat electrode assembly 14 has a pair of curved portions at either end in a direction perpendicular to the direction in which the winding axis of the flat electrode assembly 14 extends and perpendicular to the thickness direction of the flat electrode assembly 14. FIG. 2 is an enlarged view of the electrode assembly 14 at the innermost circumference side of the curved portion where the curvature is greatest.

As illustrated in FIG. 2, the electrode assembly 14 has a pair of curved portions 20A and 20B located at either end and a flat portion 21 located between the pair of curved portions 20A and 20B. In the pair of curved portions 20A and 20B, two layers of the negative plate 12 serving as a second electrode plate are disposed on the inner side of a curved portion of the positive plate 11 serving as a first electrode plate which is located at the innermost circumference. As illustrated in FIG. 2, in each of the pair of curved portions 20A and 20B, a negative plate 12B is disposed on the inner side of the curved portion of the positive plate 11 located at the innermost circumference with the separator 13 therebetween, and a negative plate 12A that does not face the positive plate 11 is further disposed on the inner side of the negative plate 12B.

According to the present embodiment, by placing at least two layers of the negative plate 12 on the inner side of the curved portion of the positive plate 11 where the curvature is greatest, the curvature of the positive plate 11, where the curvature is greatest, can be reduced. This enables the separator 13 to maintain a thickness sufficient to suppress insulation breakdown even if the separator 13 is stretched in the curved portions 20A and 20B at the innermost circumference side and, even if a high voltage is applied to the positive plate 11 and the negative plate 12.

In addition, the stress imposed on the positive plate 11 and the negative plate 12 can be suppressed at the innermost circumference side of each of the curved portions 20A and 20B, where the curvature is greatest. In this manner, peeling off of the positive electrode mixture layer or the negative electrode mixture layer from the positive electrode current collector or the negative electrode current collector can be suppressed. As a result, the occurrence of an internal short circuit caused by a peeled off mixture layer can be suppressed.

Note that in the electrode assembly 14 illustrated in FIG. 2, the negative plate 12A disposed at the innermost circumference side does not face the positive plate 11 and, thus, does not contribute to the battery reaction. However, the volume occupied by the extra wound negative plate 12A is significantly small, as compared with the volume occupied by the entire electrode assembly 14. For this reason, it does little to reduce the energy density of the battery. In particular, in batteries having a large number of winding/turns of the positive plate 11 and the negative plate 12, the reduction in the energy density of the battery is negligible. Note that from the perspective of the energy density of the battery, it is desirable to minimize the number of winding/turns of the negative plate 12 which is located at the innermost circumference side of the electrode assembly 14.

In addition, the curvature of the curved portions 20A and 20B at the innermost circumference side is controlled by the total thickness of the negative plate 12 disposed inside the curved portions 20A and 20B but not the total thickness of the negative plate 12 disposed inside the flat portion 21. Therefore, from the perspective of the energy density of the battery, it is desirable that as illustrated in FIG. 2, a winding start end 12a of the negative plate 12 be located near the end of the flat portion 21 (for example, within 10 mm from the end of the flat portion 21 and more preferably within 5 mm from the end of the flat portion 21). This location can more effectively suppress reduction in energy density of the battery.

Furthermore, as illustrated in FIG. 2, it is desirable that a winding start end 11a of the positive plate 11 be located near the end of the flat portion 21 (for example, within 10 mm from the end of the flat portion 21 and, more preferably, within 5 mm from the end of the flat portion 21). This location increases the facing area between the positive plate 11 and the negative plate 12 and, thus, further increases the energy density of the battery.

Instead of winding an extra negative plate 12 on the inner side of each of the curved portions 20A and 20B at the inner most circumference side, where the curvature is greatest, the curvature of the curved portions 20A and 20B can be reduced by winding an extra separator 13.

However, because the thickness of the separator 13 is less than the thickness of the positive plate 11 or the negative plate 12 (typically less than $1/10$ of the thickness of the positive plate 11 or the negative plate 12), the separator 13 needs to be wound tens of times to reduce the curvature of each of the curved portions 20A and 20B. In addition, in general, the electrolyte content per unit area is higher in the separator 13 than in the positive plate 11 and the negative plate 12. As a result, the separator 13, which is extra wound on the inner side of the curved portions 20A and 20B at the innermost circumference side, is permeated with a large amount of electrolyte that does not contribute to the battery reaction. As a result, the electrolyte between the facing surfaces of the positive plate 11 and the negative plate 12 tends to be relatively insufficient when charging and discharging are repeated many times, which may lead to rapid deterioration of battery performance. For these reasons, it is not desirable to extra wind the separator 13 instead of extra winding the negative plate 12 on the inner side of each of the curved portions 20A and 20B at the inner most circumference side, where the curvature is greatest.

Figure 3:
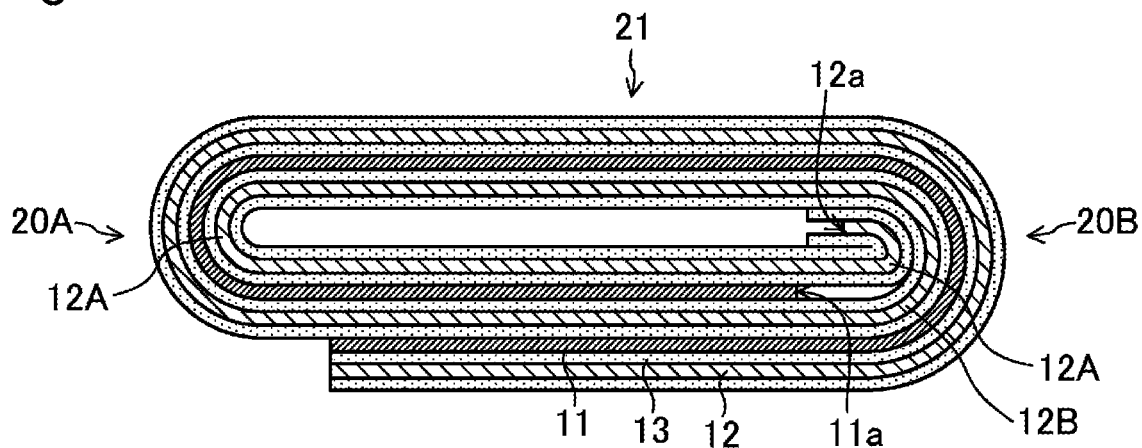
FIG. 3 is a sectional view schematically illustrating the configuration of an electrode assembly according to Embodiment 2.

While the present embodiment has been described with reference to the configuration in which, as illustrated in FIG. 2, in both of the pair of curved portions 20A and 20B, two layers of the negative plate 12 are disposed on the inner side of the curved portion of the positive plate 11 located at innermost circumference. However, as illustrated in FIG. 3, in one of the pair of curved portions 20A and 20B (the curved portion 20B in FIG. 3), two layers of the negative plate 12 may be disposed on the inner side of the curved portion of the positive plate 11 located at the innermost circumference. Even in this case, the curvature of one of the curved portions can be reduced and, thus, the same effect as the configuration of the electrode assembly illustrated in FIG. 2 can be achieved.

EMBODIMENTS

Embodiments of the present invention are described in detail below. Note that the present invention is not limited to the embodiments described below.

Embodiment 1

(1) Fabrication of Positive Plate and Negative Plate

The positive plate was fabricated by forming a positive electrode mixture layer on both sides of an aluminum foil (a positive electrode current collector) with a thickness of 15 μm. The thickness of the positive electrode mixture layer on one side was set to 76 μm after compression treatment. The length of the positive plate in the short direction was set to 131.8 mm. The width (the length in the short direction) of the positive electrode current collector exposed portion was set to 15.2 mm. The length of the positive plate in the long direction was set to 4950 mm.

As a positive electrode active material mixture layer, a mixture of $LiNi_{0.35}CO_{0.35}Mn_{0.30}O_2$ serving as a positive electrode active material, carbon black serving as a conductive material, and polyvinylidene fluoride (PVdF) serving as a binder, in a mass ratio of 96:3:1, was formed on an aluminum foil.

The negative plate was fabricated by forming a negative electrode active material layer on both sides of a copper foil (a negative electrode current collector) with a thickness of 10 μm. The thickness of the negative electrode active material mixture layer on one side was set to 67 μm after compression treatment. The length of the negative plate in the short direction was set to 133.8 mm. The width (the length in the short direction) of the negative electrode current collector exposed portion was set to 10.0 mm. The length of the negative plate in the long direction was set to 5150 mm.

As a negative electrode active material mixture, a mixture of graphite serving as a negative electrode active material, carboxymethylcellulose (CMC), and styrene-butadiene rubber (SBR) serving as a binder, in a mass ratio of 98:1:1, was formed on a copper foil.

(2) Separator

As the separator, a polyethylene/polypropylene/polyethylene multilayer separator was used. The thickness of the separator was set to 14 μm, and the width was set to 127 mm.

(3) Nonaqueous Electrolyte

A mixed solvent containing ethylene carbonate (EC), ethyl methyl carbonate (EMC), and dimethyl carbonate (DMC), in a volume ratio of 25:35:40 (25° C., 1 atm), was produced. $LiPF_6$ was added to the mixed solvent so as to be 1 mol/L, and 0.8% by mass of vinylene carbonate (VC) with respect to the total mass of the nonaqueous electrolyte was added to the mixed solvent. In this manner, the nonaqueous electrolyte was produced.

(4) Fabrication of Electrode Assembly

The number of layers of the positive plate 11 was set to 65. The positive plate 11 and the negative plate 12 are shifted from each other such that the positive electrode current collector exposed portion 15 and the negative electrode current collector exposed portion 16 do not overlap the mixture layers of the opposite electrodes and the plates were wound into a circular shape with two separators 13 therebetween. Thereafter, the flat electrode assembly 14 illustrated in FIG. 2 was produced by pressing. That is, in each of the pair of curved portions 20A and 20B, the configuration was such that two layers of the negative plate 12 were disposed on the inner side of the curved portion of the positive plate 11 at innermost circumference. Herein, the length of the electrode assembly 14 in the wound axis direction was set to 144 mm. The winding start end 12a of the negative plate 12A was determined to be located at a positon 2 mm from the end of the flat portion 21. In addition, the winding start end 11a of the positive plate 11 was determined to be located at a position 2 mm from the end of the flat portion 21.

Embodiment 2

In terms of the configuration of an electrode assembly, an electrode assembly 14 was produced in the same manner as in Embodiment 1, except that the electrode assembly was produced as a flat electrode assembly 14 illustrated in FIG. 3. That is, the configuration was such that in the curved portion 20B of the pair of curved portions 20A and 20B, two layers of the negative plate 12 were disposed on the inner side of the curved portion of the positive plate 11 at innermost circumference. Herein, the winding start end 12a of the negative plate 12A was determined to be located at a position 2 mm from the end of the flat portion 21. In addition, the winding start end 11a of the positive plate 11 was determined to be located at a position 2 mm from the end of the flat portion 21.

Comparative Example 1

Figure 4:
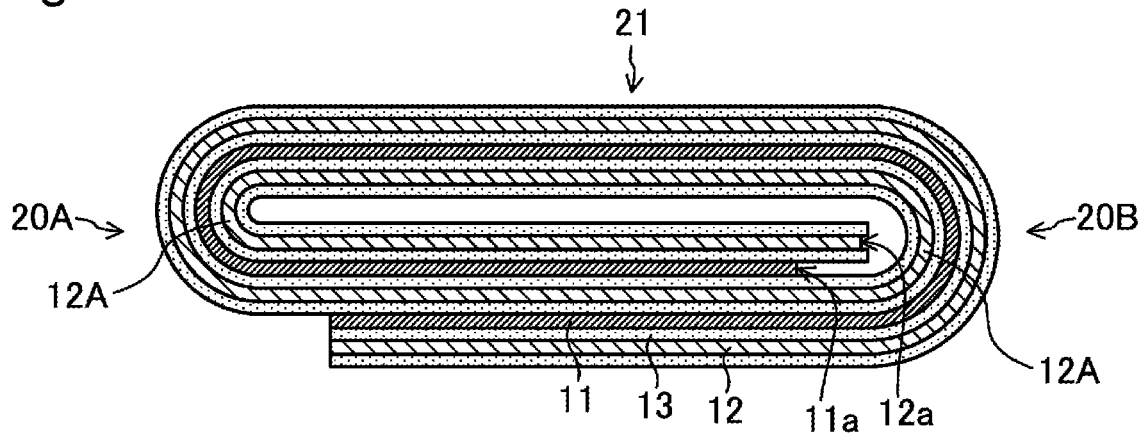
FIG. 4 is a sectional view schematically illustrating the configuration of an electrode assembly according to a comparative example.

In terms of the configuration of an electrode assembly, an electrode assembly 14 was produced in the same manner as in Embodiment 1, except that the electrode assembly was produced as a flat electrode assembly 14 illustrated in FIG. 4. That is, the configuration was such that in each of the pair of curved portions 20A and 20B, only one layer of the negative plate 12 was disposed on the inner side of the curved portion of the positive plate 11 at innermost circumference. Herein, the winding start end 12a of the negative plate 12A was determined to be located near the end of the flat portion 21. In addition, the winding start end 11a of the positive plate 11 was determined to be located at a position 2 mm from the end of the flat portion 21.

Comparative Example 2

In terms of the configuration of an electrode assembly, an electrode assembly was produced in the same manner as in Comparative Example 1, except that the electrode assembly was produced as a flat electrode assembly described in PTL 1. That is, an insulating tape having a thickness of 30 μm was attached to both sides of a curved portion of the positive plate located at the innermost circumference side.

Comparative Example 3

In terms of the configuration of an electrode assembly, an electrode assembly 14 was produced in the same manner as in Comparative Example 1, except that the thickness of a separator 13 was set to 20 μm.

The occurrence of internal short circuit was studied for the electrode bodies manufactured according to Embodiments 1 and 2 and Comparative Examples 1 to 3 by using the following test method.
(Test Method)

An AC voltage having an effective value of 250V was applied to the positive electrode current collector exposed portion and the negative electrode current collector exposed portion for one second, and the value of a current flowing through the electrode assembly 14 was measured. If the passed current value was greater than or equal to 110 mA, it was determined that a short circuit occurred. At this time, the electrode assembly 14 was disassembled to identify a part in which the short circuit occurred and determined whether an internal short circuit occurred between the positive plate and the negative plate located at the innermost circumference of the curved portion of the electrode assembly 14.

Table 1 reports the results of the test. In Table 1, the short circuit occurrence ratio represents the ratio of the number of samples in which an internal short circuit occurred between the positive plate and the negative plate located at the innermost circumference to the number of samples (200 samples) of the fabricated electrode assembly. In addition, Table 1 reports the energy density obtained by dividing the capacitance value obtained from the electrode assembly 14 fabricated in each of Embodiments 1 and 2 and Comparative Examples 1, 2, and 3 by the volume of the electrode assembly. In Table 1, the energy density of the electrode assembly of Comparative Example 1 is set to 100, and the relative energy density of each of the other electrode bodies is provided.

TABLE 1

|  | Energy Density | Short Circuit Occurrence Ratio |
| --- | --- | --- |
| Embodiment 1 | 99.8 | 0% |
| Embodiment 2 | 99.8 | 0.4% |
| Comparative Example 1 | 100 | 0.8% |
| Comparative Example 2 | 98.6 | — |
| Comparative Example 3 | 96.5 | — |

As can be seen from Table 1, in terms of the electrode assembly of Embodiment 1, the internal short circuit occurrence ratio between the positive plate and the negative plate located at the innermost circumference is zero. In addition, in terms of the electrode assembly of Embodiment 2, the internal short circuit occurrence ratio between the positive plate and the negative plate located at the innermost circumference is reduced to ½, as compared with the electrode assembly of Comparative Example 1. This is probably because in both electrode bodies of Embodiment 1 and Embodiment 2, two layers of the negative plate 12 are disposed on the inner side of at least one of the pair of curved portions of the positive plate 11 located at the innermost circumference and, thus, the curvature of the curved portion is reduced.

Note that in the case of Comparative Example 2 and Comparative Example 3, the internal short circuit occurrence ratio between the positive plate and the negative plate located at the innermost circumference is thought to be zero. However, the energy density is greatly reduced, as compared with the electrode assembly of Comparative Example 1.

In contrast, in the electrode bodies of Embodiment 1 and Embodiment 2, the energy density is hardly reduced, as compared with the electrode assembly of Comparative Example 1.

As can be seen from the above results, in a nonaqueous electrolyte secondary battery including a flat electrode assembly having a pair of curved portions, by providing the configuration in which in at least one of the pair of curved portions, at least two layers of a second electrode plate are disposed on the inner side of the curved portion of the first electrode plate located at the innermost circumference, the occurrence of internal short circuit between the positive plate and the negative plate located at the innermost circumference, where the curvature of the curved portion is greatest, can be suppressed while suppressing a decrease in the energy density of the battery.

While the present invention has been described above with reference to exemplary embodiments, the above descriptions are not limited thereto, and various modifications can be made. For example, while the above embodiments have been described with reference to the example in which at least two layers of the negative plate (the second electrode plate) 12 are disposed on the inner side of the curved portion of the positive plate (the first electrode plate) 11 located at the innermost circumference, a configuration in which at least two layers of the positive plate (the second electrode plate) 11 are disposed on the inner side of a curved portion of the negative plate (the first electrode plate) 12 located at the innermost circumference may be employed.

In addition, while the above embodiments have been described with reference to the separator 13 having a thickness of 14 μm as an example, the thickness is not limited thereto. To suppress a decrease in the energy density of the battery, the thickness of the separator is preferably less than or equal to 25 μm, more preferably less than or equal to 20 μm, and even more preferably less than or equal to 15 μm.

Furthermore, while the above embodiments have been described with reference to the configuration in which the electrode assembly 14 is disposed in such a direction that its winding axis is parallel to the bottom of the battery case 25, the electrode assembly 14 may be disposed in such a direction that the winding axis is perpendicular to the bottom of the battery case 25.

In addition, widely used materials can be used for the positive and negative electrode current collectors, the mixture layers, the separator, the nonaqueous electrolyte, and the like.

Furthermore, in FIGS. 2 to 4, a portion of the separator 13 that is disposed at the innermost circumference of the electrode assembly 14 is not illustrated. However, a wound portion of only the separator 13 may be provided at the innermost circumference of the electrode assembly 14.

REFERENCE SIGNS LIST 10 nonaqueous electrolyte secondary battery
11 positive plate
11a winding start end of positive plate
12, 12A, 12B negative plate
12a winding start end of negative plate
13 separator
14 electrode assembly
15 positive electrode current collector exposed portion
16 negative electrode current collector exposed portion
17 positive electrode current collector plate
18 positive electrode terminal
19 negative electrode current collector plate
20A, 20B pair of curved portions
21 flat portion
22 negative electrode terminal
23 sealing plate
24 insulating sheet
25 battery case
26, 27 insulating member

The invention claimed is:

1. A nonaqueous electrolyte secondary battery comprising:
an electrode assembly formed by winding, into a flat shape, a first electrode plate having a first electrode mixture layer formed on a first electrode current collector, a second electrode plate having a second electrode mixture layer formed on a second electrode current collector, and a separator therebetween,
wherein the electrode assembly has a pair of curved portions located at either end and a flat portion between the pair of curved portions,
wherein in at least one of the pair of curved portions, at least two layers of the second electrode plate are disposed on an inner side of a curved portion of the first electrode plate located at an innermost circumference, and
wherein each of the at least two layers of the second electrode plate disposed on the inner side of the curved portion of the first electrode plate located at the innermost circumference has the second electrode mixture layer formed on both sides of the second electrode current collector.

2. The nonaqueous electrolyte secondary battery according to claim 1, wherein the first electrode plate is a positive plate, and the second electrode plate is a negative plate.

3. The nonaqueous electrolyte secondary battery according to claim 1, wherein in both of the pair of curved portions, the at least two layers of the second electrode plate are disposed on the inner side of the curved portion of the first electrode plate located at the innermost circumference.

4. The nonaqueous electrolyte secondary battery according to claim 1, wherein at an innermost circumference side of the electrode assembly, a winding start end of the second electrode plate is located within 10 mm from an end of the flat portion.

5. The nonaqueous electrolyte secondary battery according to claim 1, wherein at an innermost circumference side of the electrode assembly, a winding start end of the first electrode plate is located within 10 mm from an end of the flat portion.

6. The nonaqueous electrolyte secondary battery according to claim 1, wherein a thickness of the separator is less than or equal to 15 μm.

* * * * *